United States Patent
Bigelow et al.

(10) Patent No.: US 10,301,211 B2
(45) Date of Patent: May 28, 2019

(54) MECHANICALLY FORMING CRACK INITIATION DEFECTS IN THIN GLASS SUBSTRATES USING AN ABRASIVE SURFACE

(71) Applicant: CORNING INCORPORATED, Corning, NY (US)

(72) Inventors: Donald Orrin Bigelow, Honeoye Falls, NY (US); Robertson Dewhurst Booth, Elmira, NY (US); James Joseph Watkins, Corning, NY (US)

(73) Assignee: Corning Incorporated, Corning, NY (US)

( * ) Notice: Subject to any disclaimer, the term of this patent is extended or adjusted under 35 U.S.C. 154(b) by 19 days.

(21) Appl. No.: 15/524,703

(22) PCT Filed: Nov. 5, 2015

(86) PCT No.: PCT/US2015/059176
§ 371 (c)(1),
(2) Date: May 5, 2017

(87) PCT Pub. No.: WO2016/073680
PCT Pub. Date: May 12, 2016

(65) Prior Publication Data
US 2017/0334762 A1     Nov. 23, 2017

Related U.S. Application Data

(60) Provisional application No. 62/076,539, filed on Nov. 7, 2014.

(51) Int. Cl.
*C03B 33/03* (2006.01)
*C03B 33/09* (2006.01)
(Continued)

(52) U.S. Cl.
CPC .......... *C03B 33/105* (2013.01); *C03B 33/091* (2013.01); *C03B 33/0235* (2013.01); *C03B 33/03* (2013.01)

(58) Field of Classification Search
CPC ........ C03B 33/105; C03B 33/10; C03B 33/09
(Continued)

(56) References Cited

U.S. PATENT DOCUMENTS 6,372,001 B1   4/2002 Omar et al.
8,720,228 B2   5/2014 Li
(Continued)

FOREIGN PATENT DOCUMENTS

JP   2012046400 A   3/2012
JP   5500377 B2     5/2014
(Continued)

OTHER PUBLICATIONS

English Translation of CN201580072600.1 First Office Action dated Mar. 1, 2019, China Patent Office.

*Primary Examiner* — Jennifer B Swinney
(74) *Attorney, Agent, or Firm* — Jeffrey A. Schmidt; Ryan T. Hardee

(57) ABSTRACT

A method for forming an initiation defect in a glass substrate to facilitate separating the glass substrate into a plurality of substrates is provided. The method includes providing the glass substrate and contacting a broad surface of the glass substrate with an abrasive surface thereby forming a field of initiation defects in the broad surface of the glass substrate. The field of initiation defects has a width of at least about three millimeters between outermost initiation defects. At least one initiation defect is heated with a laser source. The at least one initiation defect is cooled with a cooling fluid such that a crack initiates from the at least one initiation defect, the crack extending through a thickness of the glass
(Continued)

substrate and propagating across the glass substrate to separate the glass substrate into the plurality of substrates.

17 Claims, 5 Drawing Sheets

(51) Int. Cl.
*C03B 33/10* (2006.01)
*C03B 33/023* (2006.01)

(58) Field of Classification Search
USPC .............................................. 225/2
See application file for complete search history.

(56) References Cited

U.S. PATENT DOCUMENTS

| | | |
|---|---|---|
| 9,290,407 B2 | 3/2016 | Barefoot et al. |
| 9,919,381 B2 | 3/2018 | Abramov et al. |
| 2006/0070872 A1 | 4/2006 | Mavliev et al. |
| 2008/0276785 A1* | 11/2008 | Dahroug ............ C03B 33/0215 83/886 |
| 2012/0247154 A1* | 10/2012 | Abramov ............ C03B 33/0235 65/54 |
| 2013/0126576 A1 | 5/2013 | Marshall et al. |
| 2014/0284366 A1* | 9/2014 | Cho ...................... C03B 33/091 225/2 |

FOREIGN PATENT DOCUMENTS

| | | |
|---|---|---|
| WO | 2012141874 A1 | 10/2012 |
| WO | 2014073472 A1 | 5/2014 |

* cited by examiner

MECHANICALLY FORMING CRACK INITIATION DEFECTS IN THIN GLASS SUBSTRATES USING AN ABRASIVE SURFACE

CROSS-REFERENCE TO RELATED APPLICATIONS

This application claims the benefit of priority under 35 U.S.C. § 371 of International Patent Application Serial No. PCT/US15/59176, filed on Nov. 5, 2015, which in turn, claims the benefit of priority of U.S. Provisional Patent Application Ser. No. 62/076,539 filed on Nov. 7, 2014, the contents of each of which are relied upon and incorporated herein by reference in their entireties.

FIELD

The present specification generally relates to laser separation of thin glass substrates and, more specifically, to methods for mechanically forming crack initiation defects for use in separating thin glass substrates using laser separation techniques.

BACKGROUND

Glass substrates such as those utilized in flat panel displays and other electronic devices are generally formed from a large glass substrate which is segmented into a plurality of smaller glass substrates that are incorporated into individual devices. A variety of separation techniques may be used to separate the large glass substrate into a plurality of smaller glass substrates including laser cutting techniques. In order to separate a glass substrate by laser cutting, an initiation defect or vent crack may first be formed in the glass substrate using a single point scribe. To form the initiation defect the scribe is brought into contact with the glass substrate and a force which is normal to the surface of the glass substrate is then applied to the scribe, pressing the scribe into the surface of the glass substrate. The force exerted on the scoring wheel creates an initiation defect that extends partially through the thickness of the glass substrate. Thereafter, the initiation defect is heated and rapidly cooled to propagate a through vent from the initiation defect to separate the glass substrate.

While a scribe may be used to create an initiation defect, such single point initiation defects can require careful alignment between the initiation defect and the laser in order to heat locally at the initiation defect. This can require precise control of the glass substrate in the machine cross or lateral direction to avoid initiation defect misalignment. Use of various conveyance systems, such as air bearings can further complicate lateral movement control of the glass substrate between the initiation defect forming location and the laser source.

Accordingly, a need exists for alternative methods and apparatuses for creating crack initiation defects in thin glass substrates to facilitate separating the thin glass substrates into a plurality of individual glass substrates by laser separation.

SUMMARY

The embodiments described herein relate to methods for forming crack initiation defects in the surface of thin glass substrates without puncturing the thin glass substrates or initiating uncontrolled crack propagation in the thin glass substrates and thereby facilitate separating the thin glass substrates into a plurality of individual substrates. A diamond impregnated pad or sponge may be allowed to make contact on a leading edge of a moving glass substrate to achieve a series of flaws on the surface which then can be propagated by a thermal source in slitting applications that require movement or translation of the glass substrate and/or thermal source. Such processes and apparatuses can be webs undergoing lateral motion and supported on an air conveyance device.

According to a first aspect, a method for forming an initiation defect in a glass substrate to facilitate separating the glass substrate into a plurality of substrates is provided. The method includes providing the glass substrate and contacting a broad surface of the glass substrate with an abrasive surface thereby forming a field of initiation defects in the broad surface of the glass substrate. The field of initiation defects has a width of at least about three millimeters between outermost initiation defects. At least one initiation defect is heated with a laser source. The at least one initiation defect is cooled with a cooling fluid such as an air jet such that a crack initiates from the at least one initiation defect, the crack extending through a thickness of the glass substrate and propagating along the glass substrate to separate the glass substrate into the plurality of substrates.

According to a second aspect, there is provided the method of aspect 1, wherein the step of contacting the broad surface of the glass substrate includes contacting the broad surface of the glass substrate with an abrasive pad including the abrasive surface.

According to a third aspect, there is provided the method of aspect 1 or aspect 2, wherein the abrasive surface is at least about three millimeters in width.

According to a fourth aspect, there is provided the method of any one of aspects 1-3, wherein the abrasive surface comprises diamond abrasive particles.

According to a fifth aspect, there is provided the method of aspect 4, wherein the diamond abrasive particles are between about 10 μm and about 250 μm in diameter.

According to a sixth aspect, there is provided the method of any one of aspects 1-5, wherein the step of contacting the broad surface of the glass substrate includes contacting the broad surface of the glass substrate using a defect initiator assembly comprising an actuator that moves an abrasive pad assembly between extended and retracted configurations.

According to a seventh aspect, there is provided the method of aspect 6, wherein the actuator moves the abrasive pad assembly between the extended and retracted positions based on a signal from a detector that detects a position of the glass substrate.

According to an eighth aspect, there is provided the method of aspect 6 or aspect 7, wherein the abrasive pad assembly comprises an abrasive pad including the abrasive surface and a backing substrate comprising a foam material.

According to a ninth aspect, there is provided the method of any one of aspects 1-8, wherein the glass substrate is no more than about 0.3 mm in thickness.

According to a tenth aspect, there is provided the method of any one of aspects 1-9, wherein a force exerted by the abrasive surface against the glass substrate is sufficient to form the field of initiation defects.

According to an eleventh aspect, there is provided the method of any one of aspects 1-10, further comprising compliantly supporting the glass substrate on an air bearing.

According to a twelfth aspect, a glass processing apparatus that processes a flexible glass substrate includes a glass separating apparatus configured to separate a portion of the flexible glass substrate along a separation line using a laser source that heats an initiation defect in the flexible glass substrate. A cutting support member is configured to support the flexible glass substrate along a conveyor path without touching the flexible glass substrate. A glass defect initiator assembly includes an abrasive pad assembly having an abrasive surface. The glass defect initiator assembly includes an actuator that moves the abrasive pad assembly away from the conveyor path in a retracted configuration and toward the conveyor path in an extended configuration to contact a broad surface of the flexible glass substrate with the abrasive surface and provide a field of initiation defects in the broad surface of the flexible glass substrate.

According to a thirteenth aspect, there is provided the apparatus of aspect 12, wherein the abrasive surface is at least about three millimeters in width.

According to a fourteenth aspect, there is provided the apparatus of aspect 12 or aspect 13, wherein the abrasive surface comprises diamond abrasive particles.

According to a fifteenth aspect, there is provided the apparatus of aspect 14, wherein the diamond abrasive particles are between about 10 μm and about 250 μm in diameter.

According to a sixteenth aspect, there is provided the apparatus of any one of aspects 12-15, wherein the actuator is a pneumatic actuator.

According to a seventeenth aspect, there is provided the apparatus of any one of aspects 12-16, comprising a detector that detects position of the flexible glass substrate and provides a signal that is used to move the abrasive pad assembly between the extended and retracted configurations.

According to an eighteenth aspect, there is provided the apparatus of aspect 17, further comprising a controller that controls the actuator based on the signal from the detector.

According to a nineteenth aspect, there is provided the apparatus of any one of aspects 12-18, wherein the abrasive pad assembly comprises an abrasive pad that includes a backing substrate comprising a foam material.

According to a twentieth aspect, there is provided the apparatus of any one of aspects 12-19, wherein the glass separating apparatus further comprises a cooling nozzle configured to provide a cooling jet of a cooling fluid to cool an initiation defect with a cooling fluid such that a crack initiates from the initiation defect.

Additional features and advantages of the disclosure will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
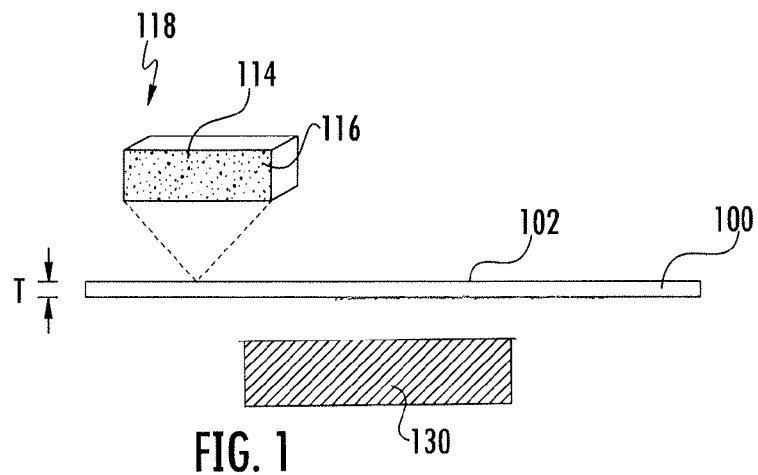
FIG. 1 schematically depicts a method for forming a crack initiation defect in a thin glass substrate with an abrasive surface, according to one or more embodiments shown and described herein.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow;

plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

Reference will now be made in detail to embodiments of methods for mechanically forming crack initiation defects in thin glass substrates, examples of which are illustrated in the accompanying drawings. One embodiment of a method for forming crack initiation defects in the surface of glass substrates is schematically depicted in FIG. 1. The method generally includes use of an abrasive surface, such as a diamond impregnated surface of a diamond impregnated pad or sponge to generate a field of flaws on a broad surface of the glass substrates. A laser beam may be used to provide a localized thermal source on a flaw that can be used to propagate a crack through the glass substrate in a slitting process.

Cover glasses for use in electronic devices, such as flat panel displays, smart phones and the like, may be formed from thin glass substrates with thicknesses of 0.2 mm or less. These thin glass substrates are generally formed as a large sheet or ribbon of glass which is subsequently segmented into a plurality of individual glass substrates by laser separation techniques. As used herein, the term "glass substrate" is meant to include both individual sheets and longer, continuous glass ribbon, for example, that can be rolled and unrolled from a roll. It has been determined that conventional techniques for forming crack initiation defects in thin glass substrates to facilitate laser separation may result in uncontrolled separation of the thin glass substrates, puncturing the thin glass substrates or even catastrophic failure of the thin glass substrates due to the high normal force used to form the crack initiation defects and due to a high degree of alignment required between the crack initiation defect and center of the laser heating location on the glass substrate. Also, failures during the start of glass separation can result in the need to restart the process, including setup of the web path, which can result in loss of significant manufacturing time. Thus, forming crack initiation defects in the thin glass substrates can be a source of loss and high cost. Described herein are methods and apparatuses for forming crack initiation defects in glass substrates that mitigate the aforementioned difficulties.

Referring now to FIG. 1, a method of forming multiple crack initiation defects of a field of crack initiation defects in a surface 102 of a thin glass substrate 100 (i.e., a glass substrate having a thickness T no greater than about 0.3 mm including but not limited to thicknesses of, for example, about 0.01-0.05 mm, about 0.05-0.1 mm, about 0.1-0.15 mm and about 0.15-0.3 mm) is schematically depicted. The field of crack initiation defects is formed in the surface 102 of the glass substrate 100 with an abrasive material 114 carried by an abrasive impregnated surface 116 of an abrasive sponge or pad 118. The abrasive impregnated surface 116 with abrasive material 114 may be brought into contact (e.g., manually and/or automatically) with the surface 102 of the glass substrate 100 to abrade an area of the surface 102 thereby creating a field of crack initiation defects.

In the embodiments described herein the abrasive material 114 may be a diamond particle graded between about 10 μm and about 250 μm, such as between about 20 μm and about 125 μm, such as no greater than about 125 μm, such as about 40 μm in diameter in order to form crack initiation defects having a size suitable to propagate a crack therefrom. As an example, a suitable diamond abrasive surface may be provided by a 400 mesh (40 μm particles yellow) Diapad® commercially available from 3M Company. However, it should be understood that these values for the size of the abrasive particles are exemplary and that abrasive materials with larger or smaller sizes may also be utilized to form crack initiation defects in the surface of the glass substrate utilizing this method.

The abrasive surface 116 contacts the surface 102 of the glass substrate 100 with a pressure suitable to cause localized formation of a field of crack initiation defects on the surface 102 of the glass substrate 100 without causing excessive damage to the glass substrate (i.e., without creating holes completely through the thickness of the glass substrate 100). In one embodiment, the abrasive surface 116 may apply only enough force to produce the field of crack initiation defects on the glass substrate 100 that are visible, for example, when the surface 102 is illuminated at a shallow angle. Maintaining this degree of pressure applied to the surface 102 by the abrasive surface 116 helps to mitigate excessive damage of the glass substrate 100 which may lead to the formation of through holes or, alternatively, uncontrolled crack propagation. While it is desirable to maintain the pressure applied to the surface 102 of the glass substrate to mitigate excessive damage, it should be understood that pressures whereby deeper scratches are initiated may also be used to form crack initiation defects in the glass substrate 100. However, if too much pressure is applied to the surface 102, the abrasive surface 116 may create forces on the glass substrate 100 that is unequal between the sides of the glass substrate 100, creating torque on the glass substrate 100 that can cause damage to the glass substrate 100.

The abrasive surface 116 of the abrasive pad 118 may contact the glass substrate 100 to provide a contact area 120 (shown in FIGS. 2 and 3) with a width W and a length L, within which the field 122 of localized crack initiation defects 124 are formed. In some embodiments, the field 122 of localized crack initiation defects 124 may be formed at and intersect a leading edge 126 of the glass substrate 100. In other embodiments, the field of localized crack initiation defects 124 may be formed spaced from the leading edge 126 of the glass substrate 100 and/or continue beyond the leading edge 126 in the longitudinal or conveying direction of the glass substrate 100. Anticipated lateral movement of the glass substrate 100 may be used to determine the width W of the field 122 of crack initiation defects 124. For example, the width W of the field 122 of crack initiation defects 124 (i.e., between outermost initiation defects 124a and 124b) may be at least about 3 mm, such as at least about 7 mm, such as at least about 10 mm or greater. Maintaining the width W of the contact area 120 at no less than about 3 mm, such as no less than about 7 mm can increase the predictability of initiation events using, for example, edge induced flaws, as compared to point initiation defects, particularly when some lateral movement of the glass substrate 100 may occur. The length L of the field 122 of crack initiation defects 124 is dependent on the time the abrasive surface 116 is in contact with the surface 102 of the glass substrate 100 and may terminate close to the leading edge 126 (e.g., less than about 5 mm) or be considerably longer (e.g., 25 mm or more, such as 50 mm or more), particularly where a fracture is being initiated away from the leading edge 126.

The glass substrate 100 may be positioned such that the area of the glass substrate opposite the contact area 120 of the abrasive surface 116 is compliantly supported, such as when the glass substrate 100 is supported on an air cushion beneath the abrasive surface 116 or between two supports (e.g., rollers) under tension. Such an arrangement is shown in FIG. 1 where the glass substrate 100 is positioned on a support 130 such that at least a portion of the glass substrate 100 is supported on an air cushion above the support 130. In this arrangement, the glass substrate 100 may be compliantly supported such that the glass substrate 100 can flex as the abrasive surface 116 contacts the surface 102 of the glass substrate 100. Accordingly, it should be understood that the phrase "compliantly supported" means that at least a portion of the glass substrate is free to flex or recoil away from the crack initiation mechanism as the crack initiation defects are formed.

In some embodiments, the glass substrate 100 may be compliantly supported on a compliant surface as the abrasive surface 116 contacts the surface 102 of the glass substrate 100. For example, the compliant surface may be a foam pad or similar cushion on which the glass substrate 100 is positioned as the abrasive surface 116 contacts the surface 102 of the glass substrate 100. In another embodiment, the compliant surface may be an air bearing, such as a Bernoulli chuck or similar air flotation device, on which the glass substrate 100 is positioned in order to cushion the glass substrate 100 as the abrasive surface 116 contacts the surface 102 of the glass substrate 100. The compliant surface compliantly supports and cushions the glass substrate 100 and allows the glass substrate 100 to recoil slightly as the abrasive surface 116 contacts the surface 102 of the glass substrate 100 such that the depth of the localized initiation defects caused by the abrasive material can be minimized. Exemplary embodiments of compliant surfaces, specifically air bearings, are schematically depicted in FIGS. 4 and 5 and described in further detail herein.

Figure 2:
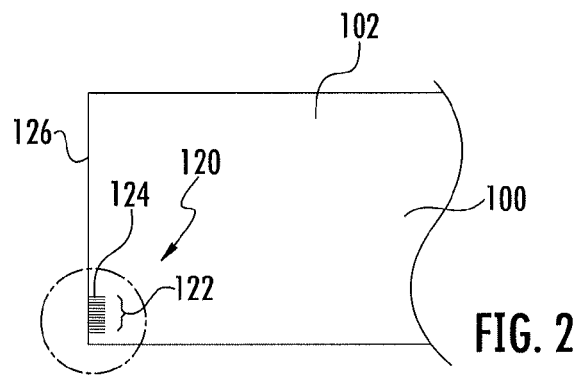
FIG. 2 schematically depicts a field of crack initiation defects formed in a surface of a glass substrate utilizing the method depicted in FIG. 1.
Figure 3:
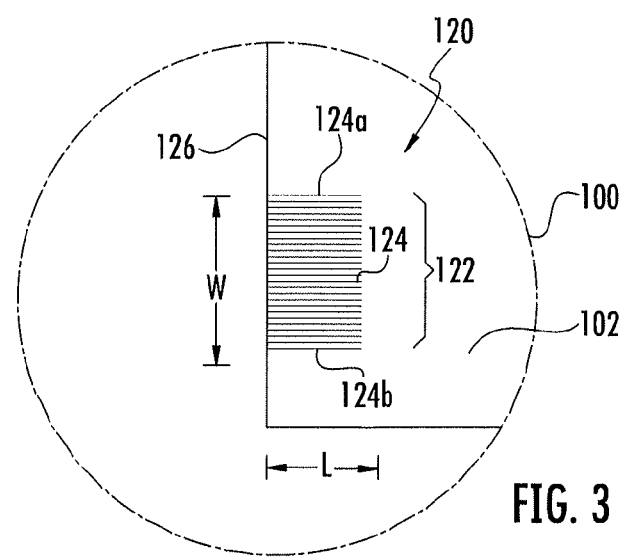
FIG. 3 schematically depicts an enlarged view of the field of crack initiation defects of FIG. 2.

Referring now to FIGS. 2 and 3, the abrasive surface 116 may be utilized to form the field 122 of crack initiation defects 124 in a localized area on the surface 102 of the glass substrate 100 which corresponds to the position of the contact area 120 of the abrasive surface 116 on the surface 102. More specifically, the abrasive material carried by the abrasive surface 116 forms the field 122 of the crack initiation defects 124 within the contact area 120. The surface density of the crack initiation defects 124 (i.e., the number of crack initiation defects per unit width) may be controlled by, for example, the density and positioning of the abrasive particles on the abrasive surface 116. Accordingly, higher abrasive particle densities on the abrasive surface 116 can yield higher crack initiation defect surface densities. For example, densities of 3 crack initiation defects 124 per millimeter of width or more may be provided. For a given contact area 120, any one of the crack initiation defects 124 located in the contact area 120 may be utilized to initiate a separation vent or crack using laser separation techniques, as will be described in more detail herein.

Figure 4:
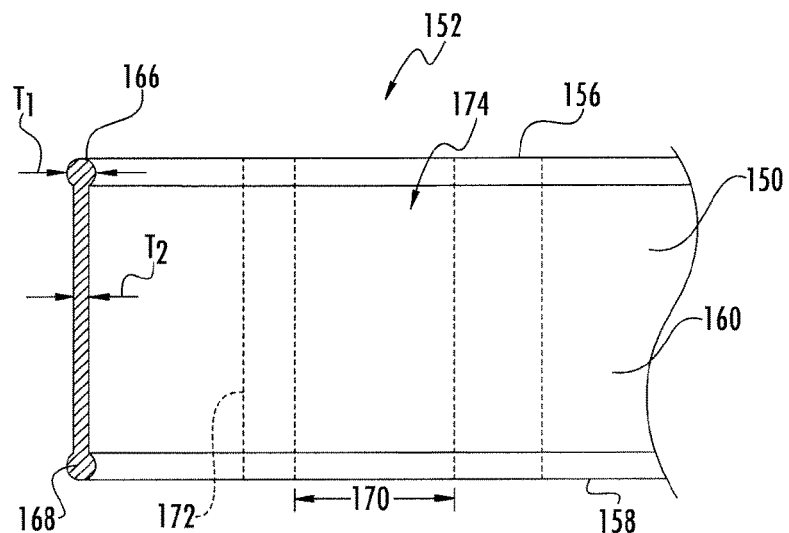
FIG. 4 schematically illustrates a top view of a portion of a glass processing apparatus according to one or more embodiments shown and described herein.
Figure 5:
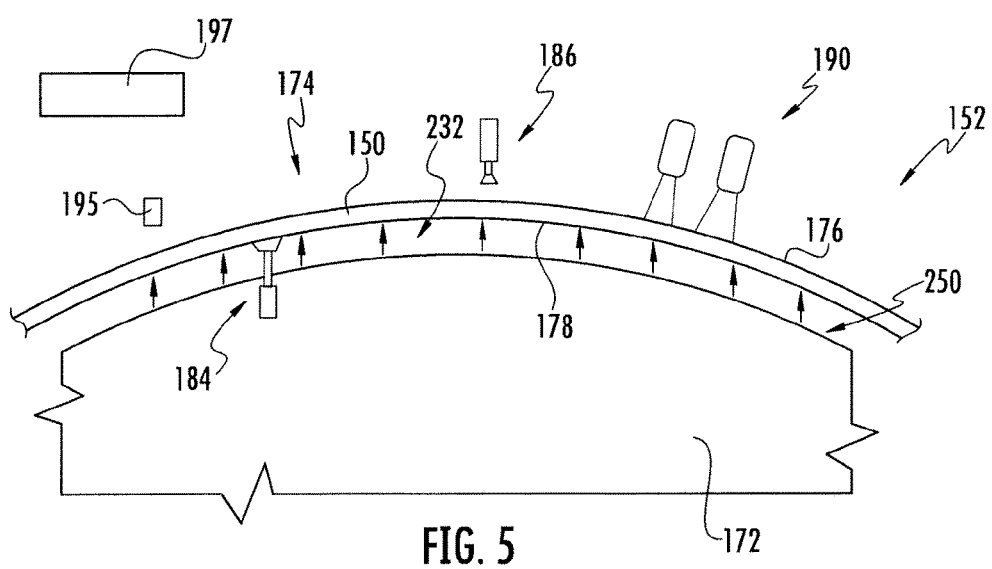
FIG. 5 schematically illustrates a side view of the glass processing apparatus depicted in FIG. 4.

Referring to FIG. 4, another flexible glass substrate 150 is illustrated as being conveyed through a glass processing apparatus 152, only a portion of which is illustrated by FIG. 4. The flexible glass substrate 150 may be conveyed in a continuous fashion from a glass source through the glass processing apparatus 152. The flexible glass substrate 150 includes a pair of opposed first and second edges 156 and 158 that extend along a length of the flexible glass substrate 150 and a central portion 160 that spans between the first and second edges 156 and 158.

In embodiments where the flexible glass substrate 150 is formed using a down draw fusion process, the first and second edges 156 and 158 may include beads 166 and 168 with a thickness $T_1$ that is greater than a thickness $T_2$ within the central portion 160. The central portion 160 may be "ultra-thin" having a thickness $T_2$ of about 0.3 mm or less including but not limited to thicknesses of, for example, about 0.01-0.05 mm, about 0.05-0.1 mm, about 0.1-0.15 mm and about 0.15-0.3 mm, 0.3, 0.29, 0.28, 0.27, 0.26, 0.25, 0.24, 0.23, 0.22, 0.21, 0.2, 0.19, 0.18, 0.17, 0.16, 0.15, 0.14, 0.13, 0.12, 0.11, 0.1, 0.09, 0.08, 0.07, 0.06, or 0.05 mm although flexible glass substrates 150 with other thicknesses may be formed in other examples.

The apparatus 152 may further include a cutting zone 170. In one example, the apparatus 152 may include a cutting support member 172 configured to bend the flexible glass substrate 150 in the cutting zone 170 to provide a bent target segment 174 with a bent orientation. Bending the target segment 174 within the cutting zone 170 can help stiffen and stabilize the flexible glass substrate 150 for improved positional control during a cutting procedure. Such stabilization can help inhibit buckling or disturbing the flexible glass substrate 150 during the cutting procedure. In other embodiments, the cutting support member 172 may not bend the flexible glass substrate 150, instead providing and supporting the flexible glass substrate 150 in a substantially planar orientation.

Referring also to FIG. 5, the cutting support member 172 can be a non-contact support member configured to support the flexible glass substrate 150 without touching the first and second broad surfaces 176 and 178 of the flexible glass substrate 150. For example, in FIG. 5, the non-contact cutting support member 172 can include one or more curved air bars configured to provide a cushion of air to space between the flexible glass substrate 150 and the cutting support member 172 to prevent the central portion 160 of the flexible glass substrate 150 from contacting the cutting support member 172. The space can also facilitate the formation of a local mechanical deformation in the flexible glass substrate 150 during a cutting operation.

The glass processing apparatus 152 may include one or more glass defect initiator assemblies 184 and 186. In the illustrated example, the glass defect initiator assembly 184 may be located below or opposite surface 178 of the flexible glass substrate 150 and glass initiator assembly 186 may be located above or opposite surface 176 of the flexible glass substrate 150 and upstream from a glass cutting apparatus 190.

Figure 6:
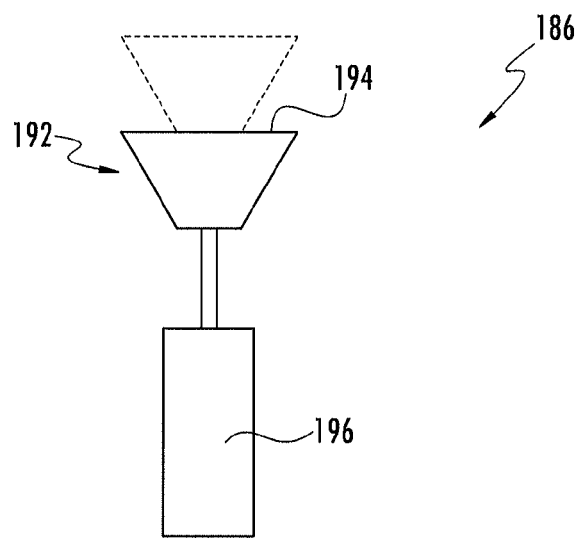
FIG. 6 schematically illustrates a glass defect initiator assembly for use with the glass processing apparatus of FIG. 5, according to one or more embodiments shown and described herein.

Referring also to FIG. 6, each glass defect initiator assembly 184, 186 may have an extended configuration (illustrated by dashed lines) where an abrasive pad assembly 192 having an abrasive surface 194 is brought into contact with one of the surfaces 176, 178 of the flexible glass substrate 150. For example, glass defect initiator assembly 184 may contact surface 178 in the extended configuration, while glass defect initiator assembly 186 may contact surface 176 in the extended position. The glass defect initiator assemblies 184, 186 may include an actuator 196 that can be used to position the glass defect initiator assemblies 184, 186 in their extended (and retracted) positions. The actuator 196 may place the abrasive surface 194 in contact with the surface 176, 178 of the glass substrate 150 with a predetermined force (e.g., as determined using a suitable load detector or other suitable sensor such as a pressure detector in an air cylinder). The actuator 196 may also place the glass defect initiator assemblies 184, 186 in their retracted positions where the abrasive surface 194 of the abrasive pad assembly 192 is separated from and out of contact with the respective surfaces 176, 178. In some embodiments, the actuator 196 may be configured to extend the abrasive pad assembly 192 a predetermined distance. Any suitable actuators may be used, such as motor driven eccentric drives, linear actuators, such as pneumatic actuators, etc.

The defect initiator assemblies 184 and 186 may be operated automatically and/or manually (e.g., based on a user input). For example, referring back to FIG. 5, edge detectors 195 may be used to provide a signal indicative of edge location in the glass processing apparatus 152. The defect initiator assemblies 184 and 186 may be placed in their extended and retracted positions (e.g., sequentially or simultaneously) based on the signals from the edge detectors. Any other suitable detector may be used to provide a signal (e.g., to a controller 197) for controlling actuation of the edge initiator assemblies 184 and 186 in order to form or stop forming a field of crack initiation defects as described above. Further, while one upstream defect edge initiator assembly 184 and one downstream defect initiator assembly 186 are illustrated, each defect initiator assembly 184 and 186 may represent a pair of edge initiator assemblies located at opposite edges of the flexible glass substrate 150 for removing the opposite edges simultaneously. Further, while both upstream and downstream defect initiators 184 and 186 are illustrated, there may be only one (e.g., one pair) upstream or downstream edge initiator assembly or there may be more than two pairs of defect initiators.

Figure 7:
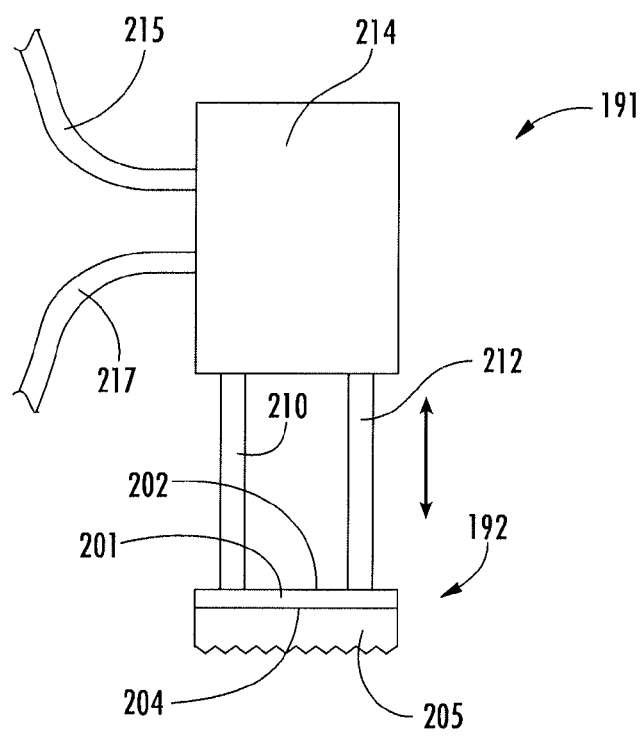
FIG. 7 schematically illustrates an abrasive pad assembly of a glass defect initiator assembly, according to one or more embodiments shown and described herein.

FIG. 7 illustrates an exemplary embodiment of another defect initiator assembly 191 including an abrasive pad assembly 192. The abrasive pad assembly 192 includes a bracket member 201 including a connecting portion 202 (e.g., for connecting to an actuator) and a pad holding portion 204 for holding an abrasive pad 205. A pair of actuator rods 210 and 212 extends outwardly from the connecting portion 202 to an air cylinder 214. The air cylinder 214 can be used to extend and retract the abrasive pad assembly 192 between extended and retracted positions as described above through the input and output of air through lines 215 and 217.

Figure 8:
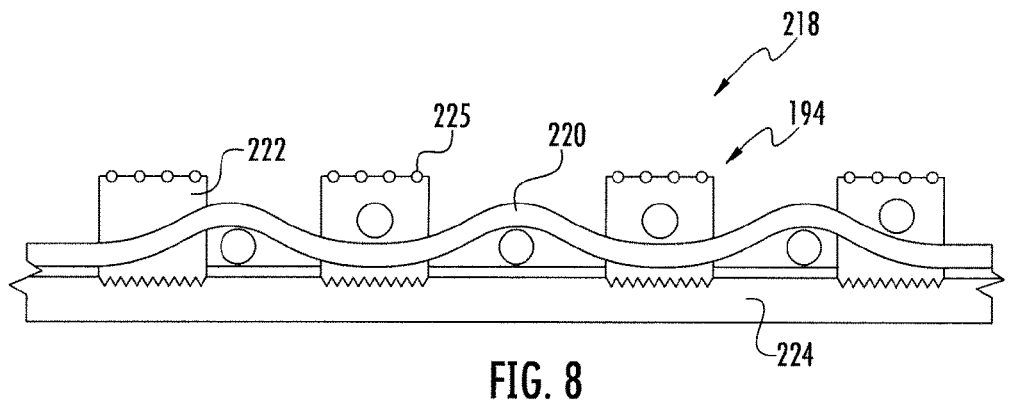
FIG. 8 schematically illustrates an abrasive pad for use with the abrasive pad assembly of FIG. 7, according to one or more embodiments shown and described herein.

Referring to FIG. 8, an exemplary abrasive pad 218 is illustrated in isolation and includes a fabric 220 with discrete islands 222 of deposited metal having abrasive grains 225 embedded in the top surface of the islands 222 defining the abrasive surface 194. The abrasive pad 218 may further include a backing substrate 224 that can be formed of any soft, resilient material, such as a foam. Advantageously, the abrasive pad 218 can be resilient and compliant, which can reduce pressure against the glass substrate when the abrasive surface 194 is applied thereto as described above. Further, the pad material can simultaneously collect removed glass particles, while providing the field of initiation defects. Additional details of the exemplary abrasive pad are described in U.S. Pat. No. 6,372,001.

Referring again to FIG. 5, in one embodiment, the glass substrate 150 is positioned on a compliant surface 230 as the field of crack initiation defects is formed in the glass substrate 150 with the defect initiator assemblies 184 and 186. The compliant surface 230 may comprise a foam material, as described above, or alternatively, the compliant surface 230 may be an air bearing, as depicted in FIG. 5. In this embodiment, the compliant surface 230 (i.e., the air bearing) supports the glass substrate 150 on an air cushion 232 as the defect initiator assemblies 184 and 186 (one pair or both pairs) are brought into contact with the glass substrate 150. The air cushion 232 can compliantly support the glass substrate 150 as the abrasive surface 194 contacts the surface 176 and/or 178 of the glass substrate 150, cushioning the glass substrate 150 and absorbing excess force applied to the glass substrate 150 thereby reducing unintended damage to the glass substrate 150.

While FIG. 5 depicts one arrangement for compliantly supporting the glass substrate, it should be understood that other arrangements are possible. For example, in an alternative embodiment, the glass substrate 150 may be compliantly supported by positioning the glass substrate on a compliant surface or held between a pair of supports, such as rollers. In these embodiments, the glass substrate 150 may be compliantly supported such that the glass substrate 150 flexes as the abrasive surface 194 impacts the surface 176 and/or 178 of the glass substrate 150 such that the depth of the initiation defects caused by the abrading fibers is minimized.

Figure 9:
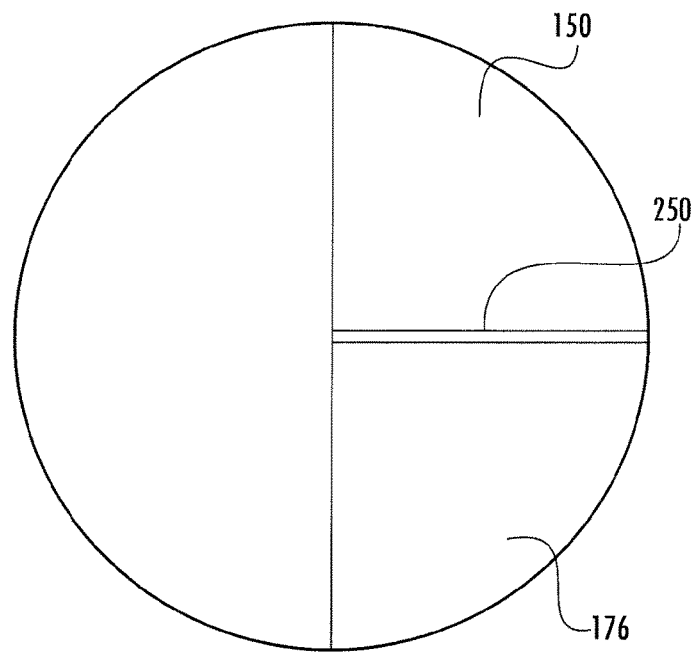
FIG. 9 schematically depicts a crack initiation defect formed in the surface of a thin glass substrate, according to one or more embodiments shown and described herein.

Referring to FIG. 9, an exemplary crack initiation defect 250 formed by the abrasive surface 194, which is illustrated as one of a field of a plurality of crack initiation defects, is schematically depicted. The crack initiation defect 250 does not extend through the thickness of the glass substrate 150. However, the depth of the crack initiation defect 250 may be dependent on the thickness of the glass substrate. For example, in some embodiments, the depth of the initiation defect is $0.1 \times T$, where T is the thickness of the glass substrate 150. The crack initiation defect 250 may have a length of 8 mm or less and may extend from an edge of the glass substrate 150. For example, in some embodiments, the length of the crack initiation defect is greater than or equal to about 2 mm and less than or equal to about 8 mm. In other embodiments the crack initiation defect has a nominal length of about 5 mm.

Figure 10:
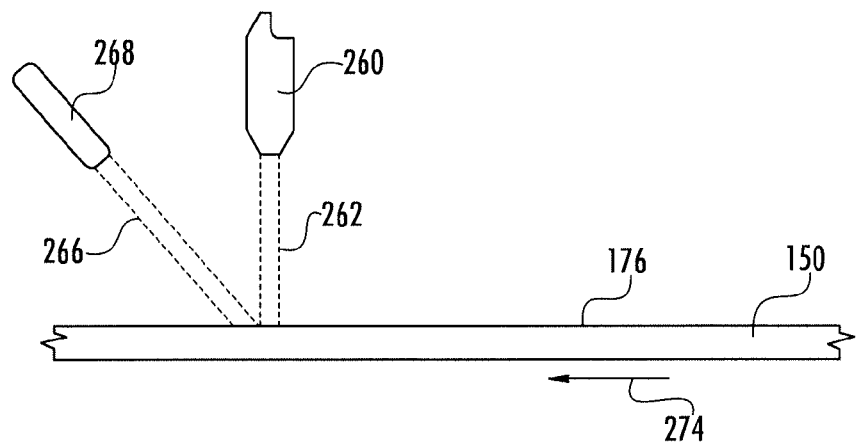
FIGS. 10 and 11 schematically depict a method for laser separating a glass substrate from a crack initiation defect according to one or more embodiments shown and described herein.
Figure 11:
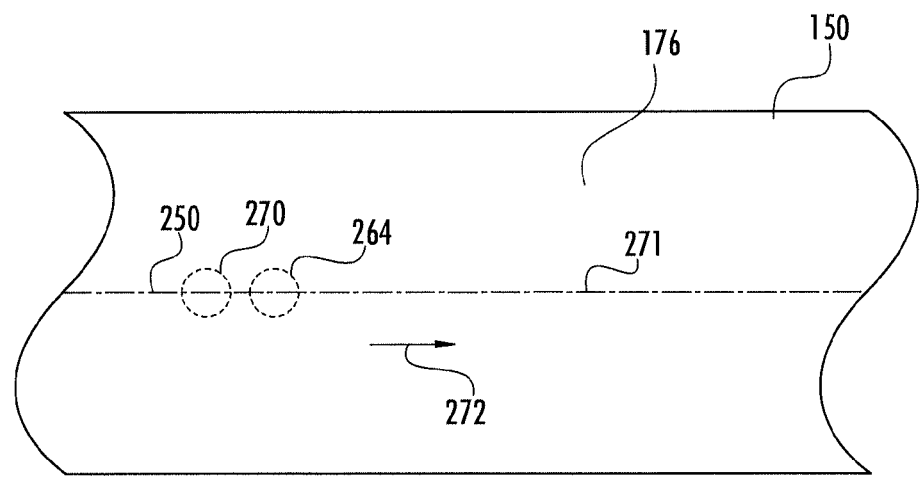

Referring now to FIGS. 10 and 11, the crack initiation defects formed utilizing the methods described herein may be used to form and propagate a through vent (i.e., a crack) in a glass substrate along a desired separation line to separate the thin glass substrate into a plurality of substrates using laser separation techniques. For example, after a crack initiation defect is formed in the surface 176 and/or 178 of the glass substrate 150 utilizing one of the methods described herein, a laser source 260 may be utilized to heat the crack initiation defect 250, and the volume of glass surrounding the crack initiation defect 250, by directing a beam 262 of the laser source 260 onto the surface 176 of the glass substrate 150. In the embodiment shown in FIGS. 10 and 11, the beam 262 of the laser source 260 has a beam spot 264 on the surface 176 of the glass substrate 150 with dimensions large enough to encompass at least a portion of the crack initiation defect 250. The beam spot 264 is positioned on the crack initiation defect 250 to heat the defect.

Once the glass substrate 150 has reached the necessary temperature by laser heating, a cooling jet 266 of cooling fluid, such as water, air, or another suitable cooling fluid, is projected onto the crack initiation defect 250 with a cooling nozzle 268. The cooling jet 266 generally forms a cooling spot 270 on the surface 176 of the glass substrate 150 with dimensions large enough to encompass at least a portion of the crack initiation defect 250. The rapid cooling of the glass surrounding the crack initiation defect 250 causes a crack to develop from the crack initiation defect and propagate through the thickness of the glass substrate 150. To propagate the crack over a desired line of separation 271 in the crack propagation direction 272, the glass substrate 150 may be moved relative to the cooling jet 266 and the beam 262 of the laser source 260 in the direction indicated by arrow 274 or, alternatively, the cooling jet 266 and the beam spot 264 may be traversed over the surface 176 of the glass substrate 150 along the line of desired line of separation 271 such that the crack propagates along the desired line of separation 271, ultimately separating the thin glass substrate 150 into a plurality of smaller glass substrates.

It should now be understood that the methods and apparatuses described herein may be used to mechanically form a field of crack initiation defects in a thin glass substrate to facilitate laser separation of the glass substrate into a plurality of individual glass substrates. The techniques for forming the crack initiation defect described herein facilitate forming the crack initiation defect with a relatively low amount of normal force applied to the glass substrate and, as such, such techniques prevent uncontrolled cracking or puncturing of the glass substrate, particularly when the glass substrate has a thickness of less than about 0.2 mm. However, it should also be understood that the techniques described herein may also be effectively used to form crack initiation defects in substrates having thicknesses greater than about 0.2 mm.

It will be apparent to those skilled in the art that various modifications and variations can be made to the embodiments described herein without departing from the spirit and scope of the claimed subject matter. Thus, it is intended that the specification cover the modifications and variations of the various embodiments described herein, provided such modification and variations come within the scope of the appended claims and their equivalents.

The invention claimed is:

1. A method for forming an initiation defect in a glass substrate to facilitate separating the glass substrate into a plurality of substrates, the method comprising:
providing the glass substrate;
supporting the glass substrate with a cutting support member to bend the glass substrate to provide a bent target segment with a bent orientation;
contacting a broad surface of the bent target segment of the glass substrate using a glass defect initiator assembly comprising an actuator coupled to an abrasive pad assembly including an abrasive surface and a backing substrate comprising a foam material, wherein the backing substrate is coupled to the actuator to move the abrasive pad assembly between an extended and retracted configuration, the abrasive surface forming a field of initiation defects in the bent target segment of the broad surface of the glass substrate, where the field of initiation defects has a width of at least about three millimeters measured from a first outermost initiation defect on one side of the field of initiation defects to a second outermost initiation defect on an opposite side of the field of initiation defects;
heating at least one initiation defect with a laser source; and
cooling the at least one initiation defect that has been heated with a cooling fluid such that a crack initiates from the at least one initiation defect, the crack extending through a thickness of the glass substrate and propagating along the glass substrate to separate the glass substrate into the plurality of substrates.

2. The method of claim 1, wherein the step of contacting the broad surface of the bent target segment of the glass substrate includes contacting the broad surface of the bent target segment of the glass substrate with an abrasive pad including the abrasive surface.

3. The method of claim 1, wherein the abrasive surface is at least about three millimeters in width.

4. The method of claim 1, wherein the abrasive surface comprises diamond abrasive particles.

5. The method of claim 4, wherein the diamond abrasive particles are between about 10 µm and about 250 µm in diameter.

6. The method of claim 1, wherein the actuator moves the abrasive pad assembly between the extended and retracted positions based on a signal from a detector that detects position of the glass substrate.

7. A flexible glass substrate separating apparatus comprising:
a glass separating apparatus configured to separate a portion of a flexible glass substrate along a separation line using a laser source that heats an initiation defect in the flexible glass substrate;
a cutting support member configured to support the flexible glass substrate along a conveyor path without touching the flexible glass substrate, and configured to bend the flexible glass substrate to provide a bent target segment with a bent orientation; and
a glass defect initiator assembly comprising an abrasive pad assembly having an abrasive pad with an abrasive surface, the abrasive pad includes a backing substrate comprising a foam material, the glass defect initiator assembly comprising an actuator that is coupled to the backing substrate and moves the abrasive pad assembly away from the conveyor path in a retracted configuration and toward the conveyor path in an extended configuration to contact a broad surface of the bent target segment of the flexible glass substrate with the abrasive surface and provide a field of initiation defects in the broad surface of the bent target segment of the flexible glass substrate.

8. The apparatus of claim 7, wherein the abrasive surface is at least about three millimeters in width.

9. The apparatus of claim 7, wherein the abrasive surface comprises diamond abrasive particles.

10. The apparatus of claim 9, wherein the diamond abrasive particles are between about 10 µm and about 250 µm in diameter.

11. The apparatus of claim 7, wherein the actuator is a pneumatic actuator.

12. The apparatus of claim 7, comprising a detector that detects position of the flexible glass substrate and provides a signal that is used to move the abrasive pad assembly between the extended and retracted configurations.

13. The apparatus of claim 12, further comprising a controller that controls the actuator based on the signal from the detector.

14. The apparatus of claim 7, wherein the glass separating apparatus further comprises a cooling nozzle configured to provide a cooling jet of a cooling fluid to cool an initiation defect with a cooling fluid such that a crack initiates from the initiation defect.

15. A glass separating apparatus comprising:
a glass separating apparatus configured to separate a portion of a flexible glass substrate along a separation line using a laser source that heats an initiation defect in the flexible glass substrate;
a cutting support member configured to support the flexible glass substrate along a conveyor path without touching the flexible glass substrate; and
a glass defect initiator assembly comprising an abrasive pad assembly having an abrasive surface, the abrasive pad includes a backing substrate comprising a foam material, the glass defect initiator assembly comprising an actuator that is coupled to the backing substrate and moves the abrasive pad assembly away from the conveyor path in a retracted configuration and toward the conveyor path in an extended configuration to contact a broad surface of the flexible glass substrate with the abrasive surface and provide a field of initiation defects in the broad surface of the flexible glass substrate, wherein the actuator is configured to move the abrasive pad assembly between the retracted configuration and the extended configuration along a first axis that is perpendicular to a conveying direction of the flexible glass substrate along the conveyor path.

16. The glass separating apparatus of claim 15, wherein a velocity of the abrasive pad assembly relative to the cutting support member along a second axis that is parallel to the conveying direction is zero as the abrasive pad assembly moves between the retracted configuration and the extended configuration.

17. The glass separating apparatus of claim 15, wherein the first axis intersects the abrasive surface when the abrasive pad assembly is in the extended configuration, the retracted configuration, and an intermediate configuration between the extended configuration and the retracted configuration.

* * * * *